United States Patent [19]

Niinomi et al.

[11] Patent Number: 4,546,166

[45] Date of Patent: Oct. 8, 1985

[54] SEALANT COMPOSITION

[75] Inventors: Masahiro Niinomi, Machida; Yukihiro Okubo, Yokohama; Yoshinori Igarashi, Kawasaki; Masashi Yoshinari, Yokohama, all of Japan

[73] Assignee: Japan Synthetic Rubber Co., Ltd., Tokyo, Japan

[21] Appl. No.: 663,115

[22] Filed: Oct. 22, 1984

[30] Foreign Application Priority Data

Oct. 22, 1983 [JP] Japan ................................. 58-197925

[51] Int. Cl.⁴ ............................................. C08G 18/10
[52] U.S. Cl. ......................................... 528/60; 528/61
[58] Field of Search .................................... 528/60, 61

[56] References Cited

U.S. PATENT DOCUMENTS

| | | | |
|---|---|---|---|
| 3,483,167 | 12/1969 | Sommer et al. | 528/61 |
| 4,267,299 | 5/1981 | Oechole | 528/60 |
| 4,376,834 | 3/1983 | Goldwasser et al. | 528/60 |
| 4,444,976 | 4/1984 | Rabito | 528/60 |

*Primary Examiner*—Maurice J. Welsh
*Attorney, Agent, or Firm*—Mary E. Picken

[57] ABSTRACT

This polyurethane sealant composition for construction materials or automotive parts cures quickly without foaming and comprises an isocyanate-terminated prepolymer and a curing agent consisting of a polyhydroxy compound, a polyamine compound, a monoamine compound, and a curing agent.

5 Claims, No Drawings

4,546,166

SEALANT COMPOSITION

DETAILED DESCRIPTION OF THE INVENTION

This invention relates to a two-liquid type polyurethane sealant composition. More precisely, it relates to a two-liquid type sealant composition which cures very quickly and does not foam.

The sealant composition of this invention is useful as sealing and caulking material and especially suitable for glass glazing and panel sealing in construction, and sealing of automobile front and back glass.

Hitherto, polysulfide compositions have been commonly used for these applications. In actual application of the polysulfide composition, however, a curing agent consisting of a metal oxide must be mixed. In addition, after mixture, its work life is quite limited. For instance, a special measuring and mixing apparatus must be provided for its application to automotive lines. Cleaning and maintenance are difficult and cost is high.

One solution to these problems is the urethane one-liquid type sealant which needs no mixing and hardens by the moisture in air. Most urethane one-liquid type sealants available on the market are, however, very slow to harden, requiring at least a few days to exhibit sufficient strength and adhesiveness. Adding a catalyst is one way to increase the hardening rate, but a simple addition of a catalyst to the currently available urethane composition for speedier hardening inevitably causes a reaction with water, while hardening to produce $CO_2$ gas. As a result, the hardened composition becomes a sponge-like substance.

Namely, this invention relates to a quickly curing, non-foaming sealant composition for construction materials or automotive parts containing the main ingredient which is composed of an isocyanate-terminated prepolymer having two or more isocyanate groups at the end and the curing agent which is composed of (a), (b), (c), and (d):

(a) a polyhydroxy compound having two or more terminal hydroxyl groups, (b) a polyamine compound having two or more $NH_2$ groups per molecule, (c) a monoamine compound having one $NH_2$ or NH per molecule and having at least one functional group, other than $HN_2$ or NH group, reactive with isocyanate groups, and (d) a curing catalyst, wherein the total active hydrogen, reactive with isocyanate groups of the curing agent's components (a), (b), and (c), is 0.8 to 1.3 mol per 1 mol of the free isocyanate groups of said isocyanate-terminated prepolymer; the total active hydrogen in amine of the components (b) and (c) is 0.3 to 0.7 mol per 1 mol of free isocyanate groups of said isocyanate-terminated prepolymer; and the total active hydrogen in amine groups of the said monoamine compound (c) is 0.3 to 2 mol per 1 mol of the active hydrogen in amine of said compound (b).

In the following reaction we shall explain the invention in more detail.

The main ingredient used in this invention is composed of a urethane-type prepolymer having two or more terminal isocyanate groups and is obtained by reacting according to the usual procedure, such active hydrogen-containing compound as polyester, polyether polyol or polyamine, which has two or more hydroxyl groups at the molecular end, with a compound having two or more isocyanate groups, that is, an organic polyisocyanate.

There is no special restriction concerning the conditions of its production, but the reaction temperature is 80° C. to 100° C. and the reaction time about 2 to 4 hours. The completion of the reaction is confirmed by measuring free isocyanate in the usual way.

Organic polyisocyanate compounds are such aliphatic polyisocyanates as ethylene diisocyanate, ethylidene diisocyanate, propylene-1,2-diisocyanate, hexamethylene diisocyanate, cyclohexane-1,2-diisocyanate, hydrogenated xylene diisocyanate and such aromatic polyisocyanates as metaphenylene diisocyanate, 2,4-toluene diisocyanate, 2,6-toluene diisocyanate, 4,4'-diphenylene diisocyanate, 4,4'-diphenyl methane diisocyanate condensate, 3,3'-dimethoxy-4,4'-diphenylene diisocyanate, 4,4'-diphenylene diisocyanate, triphenyl methane-triisocyanate, 1,5-naphthalene diisocyanate, furfuryliden diisocyanate, xylene diisocyanate, and polymers thereof. They may also be used in combination.

The primary components of the curing agent used in this invention are as follows:

(a) a polyhydroxy compound having two or more hydroxyl groups at the end, (b) a polyamine compound having two or more $NH_2$ groups per molecule, (c) an amine compound having one $NH_2$ or NH group per molecule and having at least one functional group, other than $NH_2$ or NH group, which can react with isocyanate group, and (d) a curing agent.

The $NH_2$ group in (b) and (c) is also referred to as a primary amine group, and the NH group is also referred to as secondary amine group.

The compounds belonging to (a) are polyether polyol, polyester polyols, polyether ester polyol and their acryl-modified or epoxy-modified polyol. Polyether polyol is an active hydrogen-containing multifunctional compound, such as polyhydric alcohol, polyhydric phenol, ammonia, amine, and polycarboxylic acid to which alkylene oxide is added. Polyhydric alcohols are such dihydric alcohols as ethylene glycol, propylene glycol, 1,4-butane diol, 1,6-hexane diol, diethylene glycol, neopentyl glycol and such polyhydric alcohols as glycerin, trimethylol propane, pentaerythritol, sorbitol, and cane sugar. Polyhydric phenols are, in addition to such polyhydric phenols as pyrogallol and hydroquinone, such bisphenols as bisphenol A. Amines are such monoamines as butyl amine, such aliphatic polyamines as ethylene diamine, trimethylene diamine, and diethylene triamine, such alicyclic polyamines as cyclohexylene diamine, dicyclohexacyl methane diamine, and isophorone diamine, such aromatic polyamines as phenylene diamine, tolylene diamine, xylene diamine, diphenyl methane diamine, polyphenyl methane polyamine, such heterocyclic polyamines as piperazine, and aminoethyl piperazine, and such alkanol amines as monoethanol amine, diethanol amine, and trithanol amine.

Polycarboxylic acids are such aliphatic polycarboxylic acids as succinic acid, and adipic acid and such aromatic polycarboxylic acids as phthalic acid, terephthalic acid, and trimellitic acid. The above-mentioned active hydrogen atom-containing compounds can be used in combination of two or more. Alkylene oxides to be added to the said active hydrogen atom-containing compound are ethylene oxide (hereafter referred to as EO), propylene oxide (hereafter referred to as PO), butylene oxide, tetrahydrofuran, styrene oxide, epichlorhydrine. Alkylene oxide may be used either singularly or in combination of two or more. In the latter case, it may be block addition or random addition or in combination of the two.

The molecular weight of polyether polyol is usually 300 to 10,000 and preferably 500 to 3,000. As polyester polyol and polyether ester there are, for example, a condensation polyester polyol, which is obtained by reacting a polyol and a dicarboxylic acid (or a dicarboxylic acid anhydride and an alkylene oxide) and a polyester polyol which is obtained by a ring-opening polymerization of lactone. Polyols are low polymer polyols: 1,6 hexane diol, diethylene glycol, neopentyl glycol, bis (hydroxy methyl) cyclohexane, bis (hydroxy ethyl) benzene and other diols; trimethylol propane, and glycerine; polyether polyol (polyalkylene glycol) and their mixtures. Dicarboxylic acids are succinic acids, glutamic acid, adipic acid, sebaccic acid, maleic acid, fumaric acid, phthalic acid, terephthalic acid, dimer acid, and their mixtures. In addition, one also may use the polyether ester polyol which is produced by reacting a polycarboxylic acid anhydride and a cyclic ether compound with the polyoxyalkylene polyol described in Japanese Koho Pat. No. 1973-10078.

As the compounds belonging to (b), there are such aliphatic polyamine compounds as ethylene diamine, diethylene triamine, triethylene tetraamine, tetraethylene pentamine, pentaethylene hexamine, tetramethylene diamine, pentamethylene diamine, hexamethylene diamine, and cyclohexylene diamine, and such aromatic polyamine compounds as o-phenylene diamine, m-phenylene diamine, p-phenylene diamine, 4,4'-diamino diphenyl methane, 4,4'-diaminophenyl sulfone, 4,4'-diaminodiphenyl ether, 2,4-diaminodiphenyl amine, 1,5-diaminonaphthalene, 1,8-diaminonaphthalene, and 2,4-diamino toluene. Of the aliphatic polyamine compounds, ethylene diamine and diethylene triamine are preferred. Of the aromatic polyamine compounds, 4,4'-diaminodiphenyl methane are preferred. They may be used in combination.

As the compounds belonging to (c), there are such aminoalcohols as monomethanol amine, dimethanol amine, monoethanol amine, diethanol amine, and isopropanol amine. Such amino phenols as o-aminophenol, m-aminophenol, p-aminophenol, o-aminobenzyl alcohol, m-aminobenzyl alcohol, 2-amino 4-chlorphenol, 2 amino-p-cresol, 6-amino-m-cresol, and 4 amino-2,6 dichlor phenol, and such aminothiophenols as 2-aminothiophenol, 3-aminothiophenol, and 4-aminothiophenol. Of them, aminoalcohols are preferred. They may also be used in combination.

In this invention, if the total active hydrogen in amine of (b) and (c) is less than 0.3 mol per 1 mol of free isocyanate groups in the main ingredient, foaming is not effectively controlled. On the other hand, if it is more than 0.7 mol, too much heat is generated from the mixing of the main ingredient and the curing agent to be of practical use.

If the active hydrogen in amine of (c) is less than 0.3 mol per 1 mol of the active hydrogen in amine of (b), the mixture of the main ingredient and the curing agent becomes too viscous to be coated. On the other hand, if it exceeds 2.0 mol at the beginning of its mixture with the main ingredient, the cross-linking density is too small to produce a sufficient degree of hardness to control foaming.

One advantage of this invention is that the initial viscosity of a mixture of the main ingredient and the curing agent can be controlled by varying the mol ratio of the active hydrogen in component (b) and component (c). For example, when it is important for the mixture to have a high viscosity at application in order to prevent padding or dripping, (b) component is somewhat increased. In case it is important for the mixture to have a low viscosity at application in order to pour or coat a large area, (c) component is somewhat increased.

As the catalyst mentioned in (d), urethane catalysts are commonly used. Some examples include stannous acetate, stannous octanate, stannous laurate, stannous oleinate, and other stannous carboxylate; and dibutyl tin diacetate, dibutyl tin dilaurate, dubutyl tin maleate, dibutyl tin di-2-ethyl-hexoate, dilauryl tin diacetate, dioctyl tin diacetate; and other dialkyl stannous carboxylates. Likewise, one may also use trialkyl stannous hydroxide, dialkyl stannous oxide, or dialkyl stannous chloride. The examples of these compounds include trimethyl stannous hydroxide, tributyl stannous hydroxide, trioctyl stannous hydroxide, dibutyl stannous oxide, dioctyl stannous oxide, dilauryl stannous oxide, dibutyl stannous dichloride, and diactyl stannous dioctyl. Instead of or in addition to these tin compounds, one may use various tertiary amines, such as triethyl amine, benzyl dimethyl amine, triethylene diamine, and tetramethyl butane diamine. The amount of the tin catalyst is approximately from 0.01 to 0.5 parts by weight on the basis of 100 parts of the prepolymer. The amount of the tertiary amine is approximately from 0.01 to 0.5 parts by weight on the basis of 100 parts of the prepolymer.

In this invention, the amount of the curing agent is usually 10 to 200 parts by weight and preferably 20 to 100 parts by weight on the basis of 100 parts by weight of the main ingredient.

In order to give the sealant composition desired properties (for example, drip resistance or shape control) one can add an inactive filler or a plasticizer to the main ingredient and/or the curing agent. Inactive fillers are, for example, dry carbon black, silica slates, glass globules, titanium dioxide, talc, calcium carbonate, and zinc white. These fillers are added usually at a rate of 0.1 to 100 parts by weight on the basis of 100 parts by weight of the prepolymer. In order to regulate the viscosity of the sealant composition, one may add a plasticizer to the prepolymer composition. The plasticizer is added usually at a rate of 0 to 100 parts by weight on the basis of 100 parts by weight of the prepolymer. Suitable plasticizers having a mutual solubility with the prepolymer composition include dioctyl phthalate, dibutyl phthalate, tricresyl phosphate, HB-40 (Monsanto Industrial Chemicals Co.), other partially hydrogenated terpenes and chlorinated diphenyl.

The special features of this composition are speedy hardening and absence of foaming as a result of the combined use of the curing agent's two compositions (b) and (c).

This sealant composition is suitable for sealing of construction materials or automotive parts.

In the following, we shall cite some embodiments of this invention. In the examples "parts" refers to "parts by weight". It should be noted that the invention is by no means limited by the examples cited.

EXAMPLE 1

To 100 parts of polyester polyol (Ekusenol 2020, manufactured by Asahi Glass) 100 parts of 4,4'-diphenyl methane diisocyanate polymer (Sumidul 44 V-20, manufactured by Sumitomo Bayer Urethane) are added and reacted for 2 hours at 80° C. As a result, a prepolymer having 12.8% free isocyanate group is obtained. This prepolymer constitutes the primary ingredient.

To 100 parts of polyether polyol (Ekusenol 450 NE, manufactured by Asahi Glass), 1.14 parts of ethylene diamine (EDA, manufactured by Seitesu Kagaku), 2.32 parts of monoethanol amine, and 0.3 parts of triethylene diamine are added to produce the curing agent. The active hydrogen of the primary amine in monoethanol amine is 1 mol per 1 mol of the active hydrogen of the primary amine in ethylene diamine.

When the sealant, composition composed of the main ingredient, and the curing agent, at a weight rate of 100:18, is cured in the environment of 30° C. at relative humidity (RH), viscosity disappears in about 10 minutes and there is absolutely no foaming.

In this embodiment, the total active hydrogen which can react with isocyanate groups of (a), (b), and (c) in the curing agent is 1 mol per 1 mol of the free isocyanate group of the main ingredient, and the total active hydrogen of amine in (b) and (c) is 0.5 mol per 1 mol of the free isocyanate group of the main ingredient.

EXAMPLE 2

The same curing agent as in Example 1 is used, except that instead of ethylene diamine, 2.21 parts of penta ethylene hexamine are used. When the sealant composition composed of the main ingredient obtained in Example 1 and the above curing agent at the weight ratio of 100:19 is cured in the environment of 30° C. at 95% RH, viscosity disappears in about 8 minutes and there is absolutely no foaming.

EXAMPLE 3

The same curing agent as in Example 1 is used, except instead of monoethanol amine, 8.00 parts of diethanol amine are used. When the sealant composition composed of the main ingredient obtained in Example 1 and the above curing agent at the weight ratio of 100:24 is cured in the environment of 30° C. at 95% RH, viscosity disappeared in about 12 minutes and there is absolutely no foaming.

COMPARISON EXAMPLE 1

The same curing agent as in Example 1 is used, except that the ethylene diamine and monoethanol amine of Example 1 are used here at a rate of 0.57 parts and 1.16 parts, respectively. The total active hydrogen in amine of (b) and (c) is 0.25 mol per 1 mol of the free isocyanate group of the main ingredient.

When the sealant composition areas cure under the same condition of Example 1, foams appear throughout resulting in a sponge-like substance.

COMPARISON EXAMPLE 2

The same curing agent as in Example 1 is used, except that the ethylene diamine and monoethanol are used here at a rate of 1.82 parts and 3.71 parts, respectively. The total active hydrogen in amine of (b) and (c) is 0.8 mol per 1 mol of the free isocyanate group in the main ingredient.

When the main ingredients are mixed with the curing agent in the same manner as in Example 1, because of a tremendous exothermic reaction from the sudden reaction, the mixture hardens immediately after mixing and, as a result, can not be coated.

COMPARISON EXAMPLE 3

The same curing agent as in Example 1 is used, except that the ethylene diamine and monoethanol amine of example 1 are used here at a rate of 1.91 parts and 0.78 parts, respectively. The active hydrogen in amine of (c) is 0.2 mol per 1 mol of the active hydrogen in amine of (b). When the main ingredient and the curing agent are mixed in the same manner as in Example 1, the mixture becomes too viscous to be coated.

COMPARISON EXAMPLE 4

The same curing agent as in Example 1 is used, except that the ethylene diamine and monoethanol amine of Example 1 are used here at a rate of 0.65 parts and 3.32 parts, respectively. The active hydrogen in amine of (c) is 2.5 mol per 1 mol of the active hydrogen in amine of (b).

When the main ingredient and the curing agent are mixed in the same way as in Example 1 to harden the sealant composition in the environment of 30° C. at 90% RH, it foams, resulting in a sponge-like substance.

EXAMPLE 5

The compounded prepolymer resin is prepared as follows:

To 32 parts of 700 molecular weight polypropylene glycol ether diol (Olin Chemical, Stamford, Conn.) 35 parts of polymethylene polyphenylene isocyanate (Mondur MRS, Olin), and 13 parts of 1,4 cyclohexane bis methyl isocyanate are added and reacted for two hours at 80° C. Then 20 parts of hydrous magnesium silicate (talc) are added with shear to disperse the filler uniformly. The resulting mixture containing 12.5% free isocyanate (by weight) is cooled to room temperature to give an average viscosity value of 72.500 cps.

The curing agent or curative is prepared as follows:

To 58 parts of 3000 molecular weight polyethylene polypropylene glycol ether triol (Olin Chemical, Stamford, Conn.) and 12 parts of 500 molecular weight polypropylene glycol ether tetrol (Olin Chemical, Stamford, Conn.) are added 1 part ethylene diamine and 2 parts 1-amino-2-hydroxy ethane. Then 1 part silicon dioxide (Aerosil) and 25 parts talc are added with shear to disperse the filler uniformly. One part of an ammonium salt (DABCO-TMR, Sanky Co., Allentown, Pa.) used as an accelerator, and 0.5 parts dibutyl tin dilaureate catalyst are next added to the mixture.

The sealant is prepared by mixing the compounded prepolymer resin with the curative in the proper weight ratio so that the resulting product has 12.5% excess moles of hydroxyl functionality.

What we claim is:

1. A quickly curing, non-foaming sealant composition comprising an isocyanate terminated prepolymer and a curing agent containing:
   (a) a polyhydroxy compound having at least 2 terminal hydroxyl groups,
   (b) a polyamine compound having at least 2 amine groups,
   (c) a monoamine compound having a —$NH_2$ or a NH group and another functional group reactive with isocyanate groups, and (d) a curing catalyst wherein the total active hydrogen of components (a), (b), and (c) is from 0.8 to 1.3 mol per 1 mol of free isocyanate groups of said isocyanate-terminated prepolymer; the total active hydrogen in amine groups of components (b) and (c) is 0.3 to 0.7 mol per 1 mol of free isocyanate groups of said isocyanate-terminated prepolymer; and the total active hydrogen in amine groups of said monoamine compound (c) is 0.3 to 2 mol per 1 mol of the active hydrogen in amine of said compound (b).

2. The sealant composition, as recited in claim 1, wherein said isocyanate-terminated prepolymer is the reaction product of:

polypropylene glycol ether diol, polymethylene polyphenylene isocyanate, and 1,4 cyclohexane bismethyl isocyanate.

3. The sealant composition, as recited in claim 1, wherein said polyhydroxy compound (a) is a mixture of polyethylene polypropylene glycol ether triol and polypropylene glycol ether tetrol, said polyamine compound (b) is ethylene diamine, said monoamine compound and (c) is 1 amino-2-hydroxyethane.

4. A method of sealing glass which comprises applying thereto the sealant of claim 1.

5. The sealant composition of claim 1 wherein said polyhydroxy compound comprises a polyether polyol, said monoamine comprises monoethanol amine, and said polyamine comprises triethylene diamine.

* * * * *